(12) United States Patent
Tobin (10) Patent No.: US 7,729,931 B1
(45) Date of Patent: Jun. 1, 2010

(54) SYSTEMS AND METHODS FOR COMPARING AND IMPROVING SALES PERFORMANCE OVER HETEROGENEOUS GEOGRAPHICAL SALES REGIONS

(75) Inventor: Roger L. Tobin, Arlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1802 days.

(21) Appl. No.: 10/390,082

(22) Filed: Mar. 17, 2003

(51) Int. Cl.
*G06F 9/44* (2006.01)
(52) U.S. Cl. .......................................................... 705/7
(58) Field of Classification Search ....................... 705/7
See application file for complete search history.

(56) References Cited

U.S. PATENT DOCUMENTS

| 7,039,598 B2 * | 5/2006 | Tobin et al. | 705/10 |
|---|---|---|---|
| 7,069,232 B1 * | 6/2006 | Fox et al. | 705/10 |
| 2003/0130883 A1 * | 7/2003 | Schroeder et al. | 705/10 |
| 2006/0190318 A1 * | 8/2006 | Downey et al. | 705/10 |

OTHER PUBLICATIONS

Cravens, David et al., An Analytical Approach for Evaluating Sales Territory Performance Journal of Marketing. Chicago: Jan. 1972. vol. 36, Iss. 1.*
Sinha, Prabhakant et al., Sales-force decision models: Insights from 25 years of implementation Interfaces, May/Jun. 2001, vol. 31, No. 3.*
Zoltners, Andris A. et al., Sales Territory Alighment: A REview and Model Management Science, Nov. 1983, vol. 29, No. 11.*
Zoltners, Andris A. et al., The Complete Guide to Accelerating Salesforce Performance American Management Association, Apr. 2001, ISBN 0814406505.*
ZSAssociates.com Web Pages (2002) ZS Associates, Feb. 2002, Retrieved from Archive.ort May 18, 2009.*
Cravens et al., An Analytical Approach for Evaluating Sales Territory Performance Journal of Marketing, vol. 26, No. 1, 1972.*
ZAAssociates.com Web Pages (2002) ZS Associates, Feb. 2002, Retrieved from Archive.org May 18, 2009.*
Common Logarithm Worlfman Mathword, Retreived from Mathworld.com Sep. 24, 2009.*
Logarith Wikipedia.org, Sep. 24, 2009.*

* cited by examiner

*Primary Examiner*—Scott L Jarrett (57) ABSTRACT

A method of improving sales performance over multiple geographical sales regions includes determining (305) characteristics of each of the geographical sales regions and determining sales parameters, over which control can be exercised, for each of the sales regions. The method further includes modeling (310, 315, 320, 405) each of the sales regions based on the determined characteristics and sales parameters to create a model and determining (410), using the model, scores for sales parameters and revenue for each of the sales regions that allow direct comparison between each of the sales regions. The method also includes comparing (415) the scores for each of the sales regions to determine how to adjust the sales parameters to increase revenue for each of the sales regions.

30 Claims, 4 Drawing Sheets

SYSTEMS AND METHODS FOR COMPARING AND IMPROVING SALES PERFORMANCE OVER HETEROGENEOUS GEOGRAPHICAL SALES REGIONS

FIELD OF THE INVENTION

The present invention relates generally to systems and methods for analyzing sales performance and, more particularly, to systems and methods for comparing and improving sales performance over heterogeneous geographic sales regions.

BACKGROUND OF THE INVENTION

In businesses that have a large number of small independent geographical sales areas or regions, it can be difficult to compare the performance of each sales area because the characteristics associated with each sales area differ. Examples of these characteristics are population, geographic size, number of businesses, cost of living, employment, and number and size of competitors. These differences make it difficult to determine the appropriate price levels, expected customer penetration level, revenue, and market share for each sales region. In most cases, the only benchmarks are historical performance, which may or may not be good, or indices such as sales per person, which ignore the characteristics of the region. It would, thus, be desirable to have a measure of what revenue level should be expected from each region, and also norms for setting sales parameters under management control, such as prices (or price parts for multi-part prices), salesperson days per time period, customer contacts per time period, market penetration, etc. for each heterogeneous sales region of multiple sales regions.

Therefore, there exists a need for systems and methods that can compare sales performance of multiple sales regions by accounting for the effect of fixed characteristics of each sales region on revenue and determining appropriate target levels for revenue and sales parameters.

SUMMARY OF THE INVENTION

Systems and methods consistent with the present invention address this and other needs by creating norms for each sales region's revenue performance and norms for controllable sales parameters that take into account the fixed characteristics of the sales area. For example, the norms can be for revenue as well as for controllable sales parameters such as price, sales force size, etc. The ratio of actual values to the norms creates comparable scores. Systems and methods consistent with the invention may use these scores to develop relationships between performance measures (e.g., revenue) and the controllable sales parameters. The developed relationships then provide a means to optimize the controllable sales parameters to improve sales performance. The developed relationships, thus, permit the comparison of the sales performances of multiple sales regions by accounting for the effect of fixed characteristics of each sales region on revenue, and the determination of appropriate target levels for revenue and sales parameters that will enhance sales performance for each sales region.

In accordance with the purpose of the invention as embodied and broadly described herein, a method of improving sales performance over multiple geographical sales regions includes determining characteristics of each of the geographical sales regions and determining sales parameters, over which control can be exercised, for each of the sales regions. The method further includes modeling each of the sales regions based on the determined characteristics and sales parameters to create a model and determining, using the model, scores for sales parameters and revenue for each of the sales regions that allow direct comparison between each of the sales regions. The method also includes comparing the scores for each of the sales regions to determine how to adjust the sales parameters to increase revenue for each of the sales regions.

In a further implementation consistent with the present invention, a method for increasing sales revenue in each sales region of multiple sales regions includes modeling sales parameters and revenue for each of the sales regions of the multiple sales regions, based on one or more characteristics associated with each of the sales regions, to produce sales parameter and revenue norms. The method further includes comparing the sales parameter and revenue model norms to actual sales parameter and revenue values to determine future targets for the actual sales parameters to increase future revenues in each of the sales regions.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Systems and methods consistent with the present invention enable the comparison of the sales performances across multiple sales regions by factoring in the effect of fixed characteristics of each sales region on revenue, and determining appropriate target levels for revenue and sales parameters for each of the sales regions. Thus, the sales performance of multiple sales regions may account for the effect of fixed characteristics such as, for example, population, number of households, geographic size, number of retail businesses, average income of residents, cost of living, number of competitors, and size of competitors. Logged models for revenue and sales parameters may permit the determination of revenue norms and sales parameter norms that can be used to create scores that can be compared between each of the sales regions. The scores can, in turn, be used to develop relationships between performance measures (e.g., revenue) and the controllable sales parameters that provide a means to optimize the controllable sales parameters to improve sales performance.

EXEMPLARY SALES REGIONS

Figure 1:
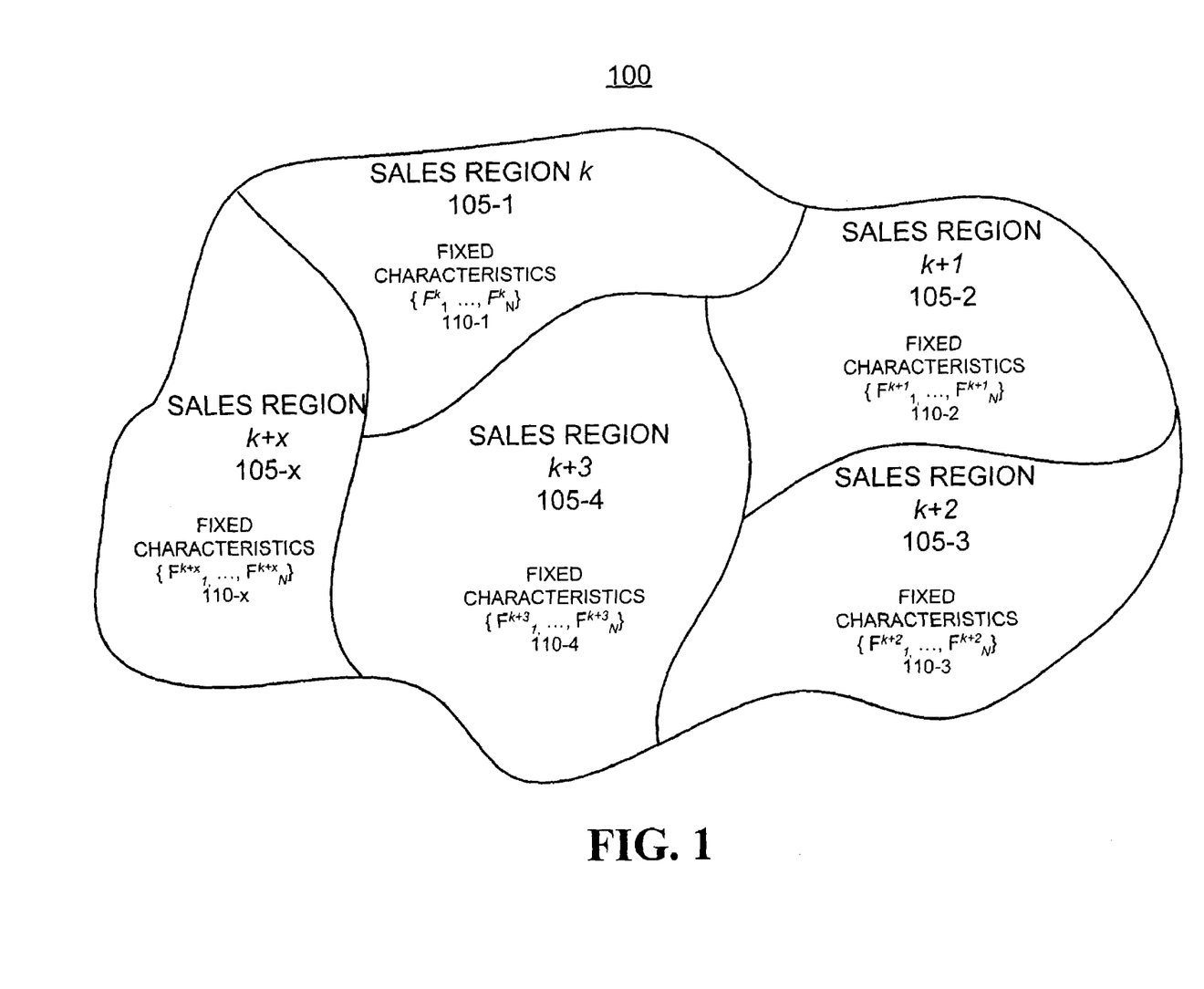
FIG. 1 illustrates a geographic sales area that includes multiple sales regions that may be analyzed and compared for improving sales performance consistent with the present invention.

FIG. 1 illustrates an exemplary geographic sales area 100 that may include multiple sales regions 105-1 through 105-x. Though sales regions 105-1 through 105-x are shown by way of example as being contiguous, one or more of the sales regions 105 may be geographically isolated from one another. Each sales region 105-1 through 105-x may include N fixed characteristics $\{F_1, \ldots, F_N\}$ 110-1 through 110-x which may include, for example, population, number of households, geographic size, number of retail businesses, average income of residents, the cost of living, and the number and size of competitors. Each sales region 105-1 through 105-x may further include m sales parameters $\{C_1, \ldots, C_m\}$ that may be controlled. The sales parameters may include, for example, price or sales force size.

EXEMPLARY PROCESSOR

Figure 2:
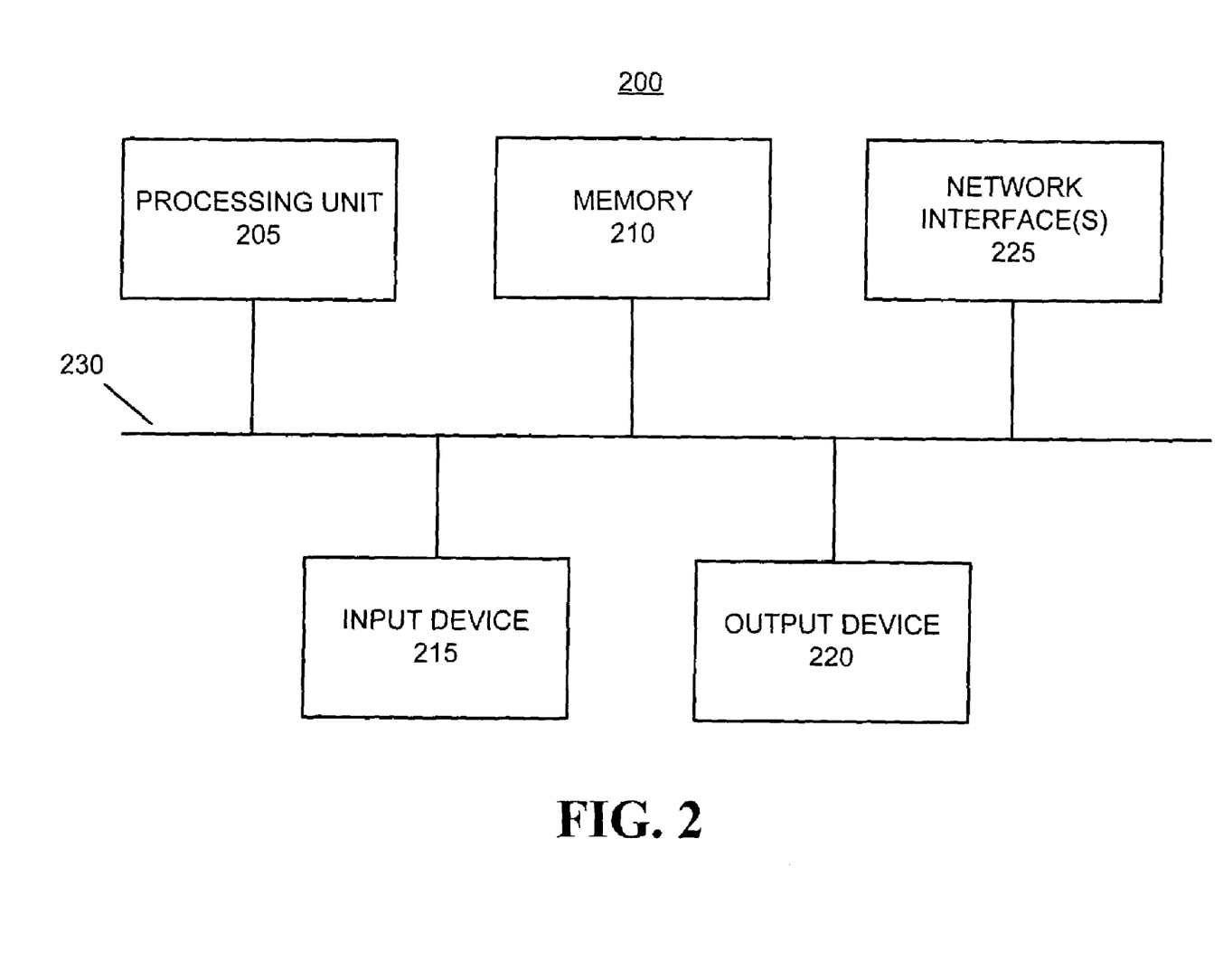
FIG. 2 illustrates a processing device that may implement an exemplary sales performance comparison and analysis process consistent with the present invention.

FIG. 2 illustrates exemplary components of a processor 200 that may implement an exemplary sales performance and analysis processes consistent with the invention. Processor 200 may include a processing unit 205, a memory 210, an input device 215, an output device 220, a network interface(s) 225 and a bus 230. Processing unit 205 may perform all data processing functions for inputting, outputting, and processing of processor data. Memory 210 may include Random Access Memory (RAM) that provides temporary working storage of data and instructions for use by processing unit 205 in performing processing functions. Memory 210 may additionally include Read Only Memory (ROM) that provides permanent or semi-permanent storage of data and instructions for use by processing unit 205. Memory 210 can also include large-capacity storage devices, such as a magnetic and/or optical recording medium and its corresponding drive.

Input device 215 permits entry of data into processor 200 and may include a user interface (not shown). Output device 220 permits the output of data in video, audio, or hard copy format. Network interface(s) 225 may interconnect processor 200 with one or more external networks, such as, for example, one or more circuit-switched or packet-switched networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks. Bus 230 interconnects the various components of processor 200 to permit the components to communicate with one another.

EXEMPLARY SALES PERFORMANCE IMPROVEMENT PROCESS

Figure 3:
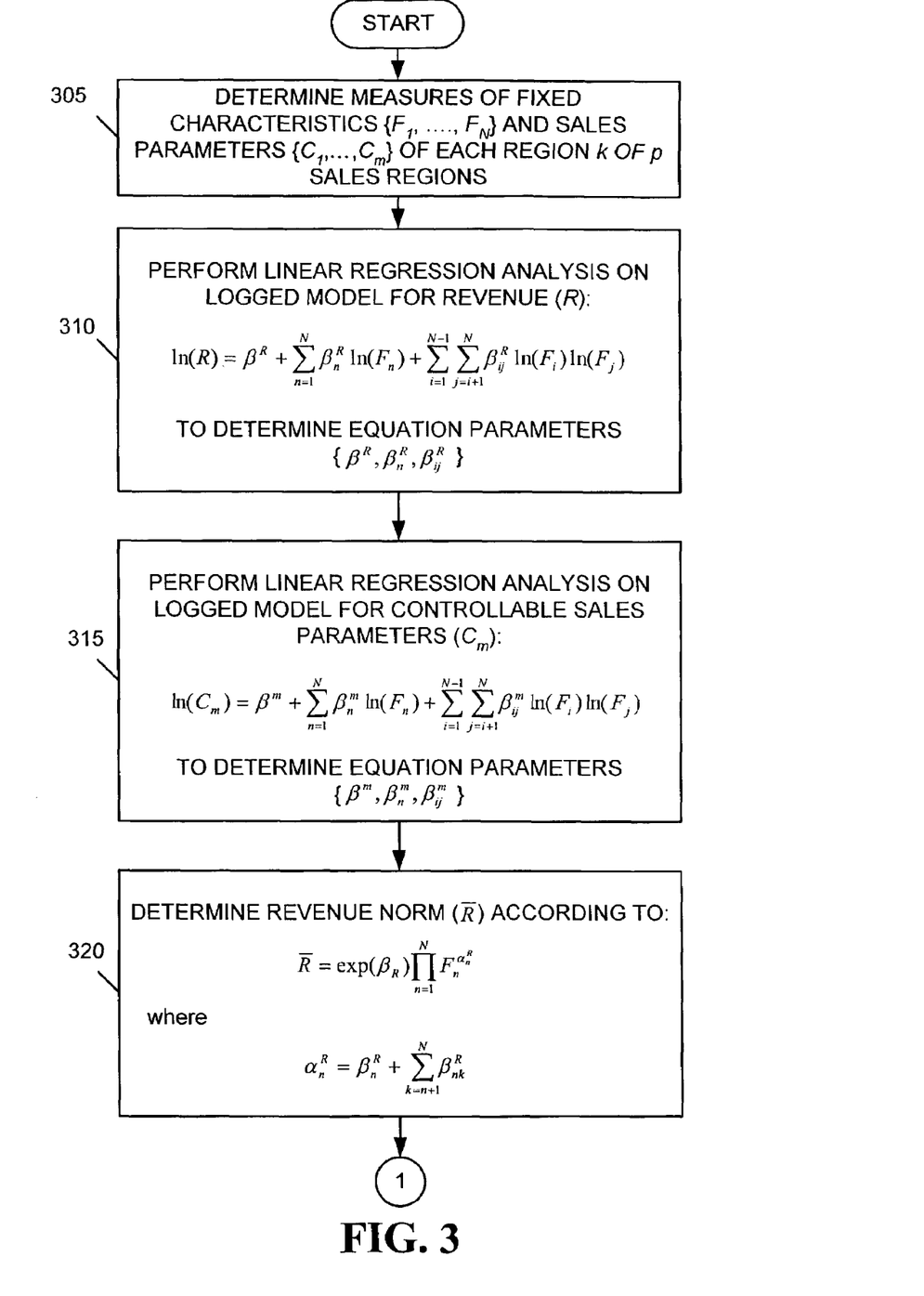
FIGS. 3 and 4 are flow charts that illustrate an exemplary process for comparing and analyzing multiple sales regions consistent with the present invention.
Figure 4:
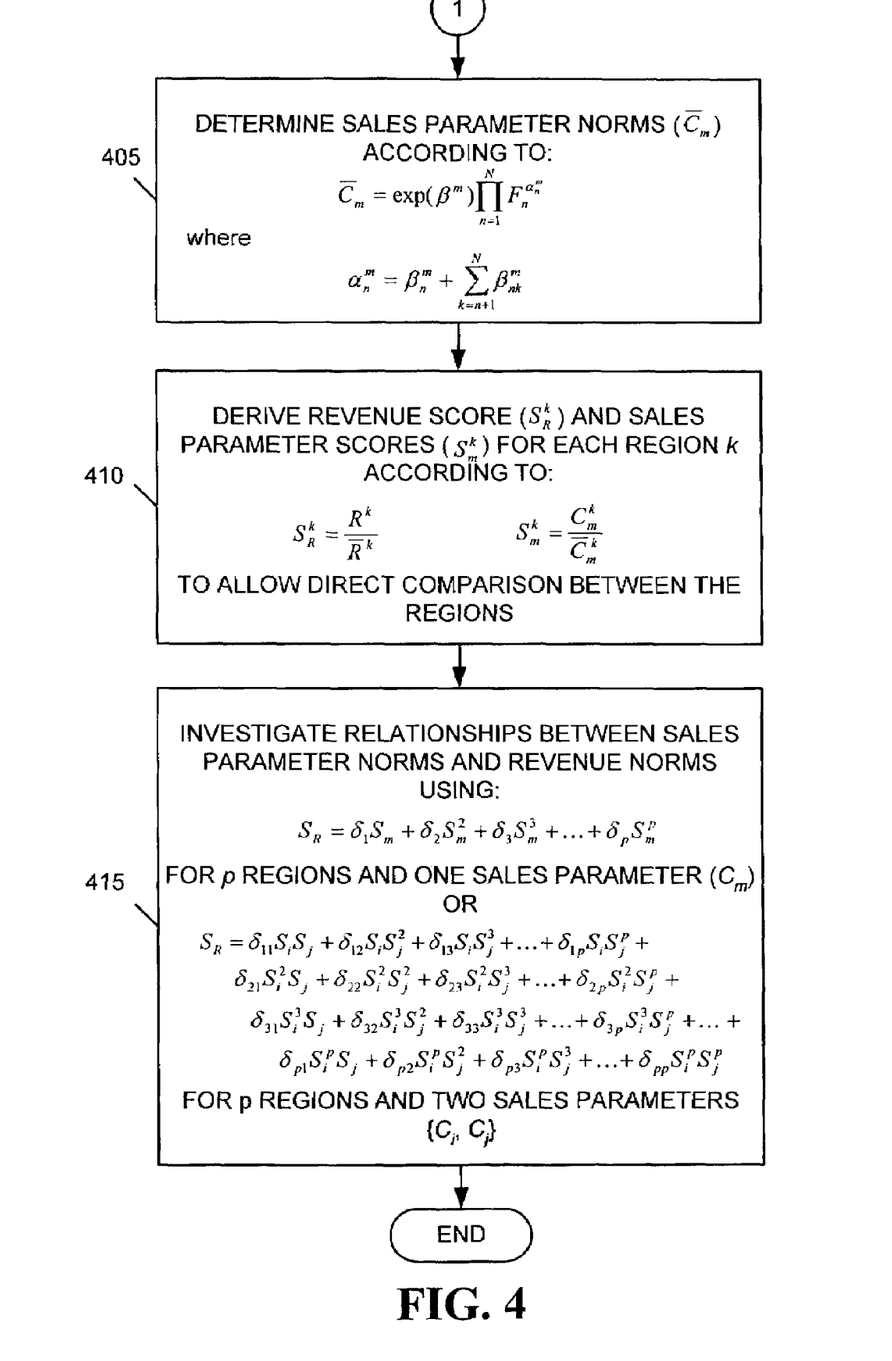

FIGS. 3-4 are flowcharts that illustrate an exemplary process, consistent with the present invention, for comparing and improving sales performance over multiple heterogeneous geographical sales regions. As one skilled in the art will appreciate, the process exemplified by FIGS. 3-4 can be implemented as a sequence of instructions and stored in a memory (e.g., memory 210) associated with processor 200 for execution by processing unit 205. Alternatively, the process exemplified by FIGS. 3-4 can be implemented in hardware and/or firmware. Additionally, the process exemplified by FIGS. 3-4 may be implemented manually by one or more individuals.

The exemplary process may begin with the determination of measures of fixed characteristics $\{F_1, \ldots, F_N\}$ and sales parameters $\{C_1, \ldots, C_m\}$ of each region k of p sales regions [act 305]. Fixed characteristics $\{F_1, \ldots, F_N\}$ may include one or more particular characteristics for each region k that correspond to a significant portion of the revenue potential of each region k as it relates to the number of potential customers or potential sales. Examples of such fixed characteristics may include, for example, population, geographic size, number of households, and number of retail businesses. Fixed characteristics $\{F_1, \ldots, F_N\}$ may further include one or more particular characteristics for each region k that move the revenue potential of the customer base up or down, such as, for example, the cost of living, average income of residents, employment, and number and strength of competitors. Sales parameters $\{C_1, \ldots, C_m\}$ may include, for example, price or sales force size.

A linear model in logged variables may be developed to relate revenue and sales parameters to the fixed characteristics. Since the range of revenue and characteristics may be relatively large across all sales regions 105 of sales area 100, the relationship of logged revenue and logged sales parameters to logged fixed characteristics is likely to be nonlinear. To capture the nonlinear effects across the entire range, products of each pair of logged characteristics may also be included in the logged model for revenue and sales parameters. For each region k to be modeled, a conventional linear regression analysis may be performed, using the determined fixed characteristics, on a logged model for revenue (R) given by the following:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i) \ln(F_j) \qquad \text{Eqn. (1)}$$

to determine the parameters $\beta^R$, $\beta_n^R$ and $\beta_{ij}^R$ [act 310]. Parameters $\beta^R$, $\beta_n^R$ and $\beta_{ij}^R$ relate the fixed characteristics $\{F_1, \ldots, F_N\}$ to the natural log of the revenue R for each sales region 105. For each region k to be modeled, a conventional linear regression analysis may also be performed, using the determined fixed characteristics, on a logged model for controllable sales parameters ($C_m$) given by the following:

$$\ln(C_m) = \beta^m + \sum_{n=1}^{N} \beta_n^m \ln(F_n) + \sum_{i=1}^{N-1} \sum_{j=i+1}^{N} \beta_{ij}^m \ln(F_i) \ln(F_j) \qquad \text{Eqn. (2)}$$

to determine the parameters $\beta^m$, $\beta_n^m$ and $\beta_{ij}^m$ [act 315]. Parameters $\beta^m$, $\beta_n^m$ and $\beta_{ij}^m$ relate the fixed characteristics $\{F_1, \ldots, F_N\}$ to the natural log of the controllable sales parameter $C_m$ for each sales region 105. The logged models represented by equations (1) and (2) enable the determination of the central tendencies, or theoretical averages, of revenues and sales parameters given each region's fixed characteristics. Because regression may be used to find central tendencies, a high value of the regression fit statistic ($R^2$) is not expected. $R^2$ indicates the amount of variation explained by the fixed characteristics. Some of the remaining variation may, however, be due to the controllable sales parameters. For example, some remaining variation in the revenue analysis may be caused by variations in sales price.

Revenue norms ($\overline{R}$) and sales parameter norms ($\overline{C}_m$), for each sales region k, may then be determined to give the central tendencies or "average" values adjusted for the fixed characteristics of each sales region. The determined revenue norms ($\overline{R}$) and sales parameters norms ($\overline{C}_m$) may be compared to actual values to determine how a particular sales region is performing, given its characteristics, relative to the average performance of all the sales regions, and how the region's sales parameters compare to average parameters adjusted for the fixed characteristics. A revenue norm ($\overline{R}$) for each sales region may be determined [act 320], using the parameters $\{\beta^R, \beta_n^R, \beta_{ij}^R\}$, according to the following:

$$\overline{R} = \exp(\beta_R) \prod_{n=1}^{N} F_n^{\alpha_n^R} \qquad \text{Eqn. (3)}$$

where $$\alpha_n^R = \beta_n^R + \sum_{k=n+1}^{N} \beta_{nk}^R \qquad \text{Eqn. (4)}$$

Sales parameter norms ($\overline{C}_m$) may then be determined [act 405], using the parameters $\{\beta^m, \beta_n^m, \beta_{ij}^m\}$, according to the following:

$$\overline{C}_m = \exp(\beta^m) \prod_{n=1}^{N} F_n^{\alpha_n^m} \text{ where} \qquad \text{Eqn. (5)}$$

$$\alpha_n^m = \beta_n^m + \sum_{k=n+1}^{N} \beta_{nk}^m \qquad \text{Eqn. (6)}$$

Using the modeled revenue norms ($\overline{R}$) and sales parameter norms ($\overline{C}_m$), and previously determined actual revenue and sales parameter values for each sales region, scores or indices may be derived [act 410] that allow direct comparison between different sales regions of sales area 100. Revenue scores ($S_R^k$) and sales parameter scores ($S_m^k$) for each sales region k may be derived from the following relations:

$$S_R^k = \frac{R^k}{\overline{R}^k} \qquad \text{Eqn. (7)}$$

$$S_m^k = \frac{C_m^k}{\overline{C}_m^k} \qquad \text{Eqn. (8)}$$

where $R^k$ represents the actual revenue for region k;
$\overline{R}^k$ represents the model value of revenue for sales region k when the values of the fixed characteristics for region k $\{F_1^k, \ldots, F_N^k\}$ are put into the model (i.e., Eq. (3) above);
$C_m^k$ represents the actual value of sales parameter m; and
$\overline{C}_m$ represents the model value for sales parameter m as determined by Eqn. (5) above.

Revenue scores ($S_R^k$) and sales parameter scores ($S_m^k$) can provide valuable management information, since the scores can show which regions have revenues above or below what should be expected, given the region's characteristics. Similarly, the scores can indicate which regions are overpriced or underpriced relative to the average adjusted by the fixed characteristics, and which regions are under-staffed or over-staffed relative to the average given the region's characteristics.

Relationships between sales parameter norms and revenue norms may then be investigated [act 415] using the following relation for p sales regions and one sales parameter ($C_m$):

$$S_R = \delta_1 S_m + \delta_2 S_m^2 + \delta_3 S_m^3 + \ldots + \delta_p S_m^p \qquad \text{Eqn. (9)}$$

or the following relation for p sales regions and two sales parameters $\{C_i, C_j\}$:

$$\begin{aligned} S_R = & \delta_{11} S_i S_j + \delta_{12} S_i S_j^2 + \delta_{13} S_i S_j^3 + \ldots + \delta_{1p} S_i S_j^p + \delta_{21} S_i^2 S_j + \\ & \delta_{22} S_i^2 S_j^2 + \delta_{23} S_i^2 S_j^3 + \ldots + \delta_{2p} S_i^2 S_j^p + \delta_{31} S_i^3 S_j + \\ & \delta_{32} S_i^3 S_j^2 + \delta_{33} S_i^3 S_j^3 + \ldots + \delta_{3p} S_i^3 S_j^p + \ldots + \delta_{p1} \\ & S_i^p S_j + \delta_{p2} S_i^p S_j^2 + \delta_{p3} S_i^p S_j^3 + \ldots + \delta_{pp} S_i^p S_j^p \end{aligned} \qquad \text{Eqn. (10)}$$

Eqn. (9) and (10) may also be adapted to include three or more sales parameters using similar functional forms. One skilled in the art will further recognize that other appropriate functional forms, instead of Eqn. (9) and Eqn. (10), may be used for relating sales parameter norms and revenue norms. The parameters $\delta$ in Eqns. (9) and (10) may be estimated using conventional linear regression analysis. The relationships shown in Eqns. (9) and (10) can reveal whether the norms ($\overline{R}$, $\overline{C}_m$) are lower or higher than they should be for optimal revenue, and indicate in what direction and how much sales parameters should be adjusted to increase revenue. Targets for the sales parameters can, thus, be set and, based on the sales parameter targets, realistic revenue targets can be developed that can increase the sales performance for each sales region k of sales area 100.

CONCLUSION

Systems and methods consistent with the present invention, therefore, enable the comparison of the sales performances of multiple heterogeneous sales regions by factoring in the effect of fixed characteristics of each sales region on revenue and determining appropriate target levels for revenue and sales parameters for each of the sales regions. The sales performance of multiple sales regions may, thus, account for the effect of fixed characteristics such as, for example, population, number of households, geographic size, number of retail businesses, average income of residents, cost of living, number of competitors, and size of competitors. Logged models for revenue and sales parameters may permit the determination of revenue norms and sales parameter norms that can be used to develop relationships between performance measures (e.g., revenue) and the controllable sales parameters that provide a means to optimize the controllable sales parameters to improve sales performance.

The foregoing description of embodiments of the present invention provides illustration and description, but is not intended to be exhaustive or to limit the invention to the precise form disclosed. Modifications and variations are possible in light of the above teachings or may be acquired from practice of the invention. While a series of acts have been described in FIGS. 3-4, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of improving sales performance over a plurality of geographical sales regions, comprising:
    providing a computer system, wherein the computer system comprises a processor and a software module embodied on a computer-readable medium, the software module comprising a set of instructions for execution by the processor;
    determining characteristics of each of the geographical sales regions;
    determining a sales parameter, over which control can be exercised, for each of the sales regions;
    developing, by the processor, a logged model relating revenue and the sales parameter to the characteristics, for each of the sales regions;
    performing an analysis of the logged model to determine model parameters relating the revenue and the sales parameter to the characteristics;
    producing, by the processor, a revenue norm and a sales parameter norm for each of the sales regions based on the model parameters;
    producing, by the processor, a revenue score and a sales parameter score for each of the sales regions based on the revenue norm and the sales parameter norm for each of the sales regions; and
    comparing the revenue and sales parameter scores for each of the sales regions to determine how to adjust the sales parameter to increase revenue for each of the sales regions,
    wherein developing a logged model comprises:
        creating a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i) \ln(F_j)$$

where $F_x$ represents one of the determined characteristics for an associated sales region, and
        N is a number of the determined characteristics of the associated sales region.

2. The method of claim 1, wherein the characteristics comprise at least one of population, number of households, geographic size, number of retail businesses, average income of residents, cost of living, number of competitors, and size of competitors.

3. The method of claim 1, wherein the sales parameter comprises one of price and sales force size.

4. The method of claim 1, wherein performing an analysis of the logged model comprises:
    performing linear regression analysis on the logged revenue model to determine the model parameters $\beta^R$, $\beta_n^R$ and $\beta_{ij}^R$.

5. The method of claim 4, wherein developing a logged model comprises:

creating a logged model for sales parameters ($C_m$) that comprises:

$$\ln(C_m) = \beta^m + \sum_{n=1}^{N} \beta_n^m \ln(F_n) + \sum_{i=1}^{N-1} \sum_{j=i+1}^{N} \beta_{ij}^m \ln(F_i) \ln(F_j)$$

6. The method of claim 5, wherein performing an analysis of the logged model comprises:
    performing linear regression analysis on the logged sales parameter model to determine the model parameters $\beta^m$, $\beta_n^m$ and $\beta_{ij}^m$.

7. The method of claim 6, wherein producing a revenue norm and a sales parameter norm further comprises:
    producing a revenue norm ($\overline{R}$) for each of the sales regions according to:

$$\overline{R} = \exp(\beta_R) \prod_{n=1}^{N} F_n^{\alpha_n^R}, \text{ where}$$

$$\alpha_n^R = \beta_n^R + \sum_{k=n+1}^{N} \beta_{nk}^R.$$

8. The method of claim 7, wherein producing a revenue norm and a sales parameter norm further comprises:
    producing a sales parameter norm ($\overline{C}_m$) for each of the sales regions according to:

$$\overline{C}_m = \exp(\beta^m) \prod_{n=1}^{N} F_n^{\alpha_n^m}, \text{ where}$$

$$\alpha_n^m = \beta_n^m + \sum_{k=n+1}^{N} \beta_{nk}^m.$$

9. The method of claim 8, wherein producing a revenue score and a sales parameter score further comprises:
    producing a revenue score ($S_R^k$) for each region k according to:

$$S_R^k = \frac{R^k}{\overline{R}^k}$$

where $R_k$ represents an actual revenue for region k.

10. The method of claim 9, wherein producing a revenue score and a sales parameter score further comprises:
    producing a sales parameter score ($S_m^k$) for each region k according to:

$$S_m^k = \frac{C_m^k}{\overline{C}_m^k}$$

where ($C_m^k$) represents an actual sales parameter value for region k.

11. The method of claim 10, wherein comparing the revenue and sales parameter scores for each of the sales regions comprises:

investigating relationships between the sales parameter and revenue according to:

$$S_R = \delta_1 S_m + \delta_2 S_m^2 + \delta_3 S_m^3 + \ldots + \delta_p S_m^p$$

for p sales regions and one sales parameter ($C_m$).

12. The method of claim 10, wherein comparing the revenue and sales parameter scores for each of the sales regions comprises:
   investigating relationships between sales parameters and revenue according to:

$$\begin{aligned} S_R = & \delta_{11} S_i S_j + \delta_{12} S_i S_j^2 + \delta_{13} S_i S_j^3 + \ldots + \delta_{1p} S_i S_j^p + \delta_{21} S_i^2 S_j + \\ & \delta_{22} S_i^2 S_j^2 + \delta_{23} S_i^2 S_j^3 + \ldots + \delta_{2p} S_i^2 S_j^p + \delta_{31} S_i^3 S_j + \\ & \delta_{32} S_i^3 S_j^2 + \delta_{33} S_i^3 S_j^3 + \ldots + \delta_{3p} S_i^3 S_j^p + \ldots + \delta_{p1} S_i^p S_j + \delta_{p2} S_i^p S_j^2 + \delta_{p3} S_i^p S_j^3 + \ldots + \delta_{pp} S_i^p S_j^p \end{aligned}$$

for p sales regions and two sales parameters $\{C_i, C_j\}$.

13. A computer-readable medium containing instructions for controlling at least one processor to perform a method of improving sales performance over a plurality of geographical sales regions, the method comprising:
   determining a sales parameter, over which control can be exercised, for each of the sales regions;
   developing a logged model relating revenue and the sales parameter to known characteristics associated with each of the sales regions;
   performing an analysis of the logged model to determine model parameters relating the revenue and the sales parameter to the characteristics;
   producing a revenue norm and a sales parameter norm for each of the sales regions based on the model parameters;
   producing a revenue score and a sales parameter score for each of the sales regions based on the revenue norm and the sales parameter norm for each of the sales regions;
   comparing the revenue and sales parameter scores for each of the sales regions; and
   adjusting the sales parameter to increase revenue for at least one of the sales regions based on the comparing,
   wherein developing a logged model comprises:
      creating a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i)\ln(F_j)$$

where $F_x$ represents one of the determined characteristics for an associated sales region, and
      N is a number of the determined characteristics of the associated sales region.

14. A system for improving sales performance over a plurality of geographical sales regions, comprising:
   a memory configured to store instructions; and
   a processor configured to execute the instructions in the memory to:
      determine one or more characteristics of each of the geographical sales regions, wherein the one or more characteristics comprise at least one of population, number of households, geographic size, number of retail businesses, average income of residents, cost of living, number of competitors, and size of competitors,
      determine a sales parameter, over which control can be exercised, for each of the sales regions, wherein the sale parameter comprises one of price and sales force size,
      develop a logged model relating revenue and the sales parameter to one or more characteristics for each of the sales regions;
      perform an analysis of the logged model to determine model parameters relating the revenue and the sales parameter to the characteristics;
      produce a revenue norm and a sales parameter norm for each of the sales regions based on the parameters determined using the logged model,
      produce a revenue score and a sales parameter score for each of the sales regions based on the revenue norm and the sales parameter norm for each of the sales regions, and
      compare the revenue and sales parameter scores for each of the sales regions to determine how to adjust the sales parameter to increase revenue for at least one of the sales regions,
   wherein the instructions to develop the logged model comprise instructions to:
      create a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i)\ln(F_j)$$

where $F_x$ represents one of the determined characteristics for an associated sales region, and
      N is a number of the determined characteristics of the associated sales region.

15. A method for increasing sales revenue in each sales region of a plurality of sales regions, comprising:
   providing a computer system, wherein the computer system comprises a processor and a software module embodied on a computer-readable medium, the software module comprising a set of instructions for execution by the processor;
   developing, by the processor, a logged model relating a sales parameter and revenue to one or more characteristics associated with each sales region of the plurality of sales regions, to produce, by the processor, a sales parameter norm and a revenue norm based on parameters determined by performing and analysis the logged model; and
   comparing the sales parameter and revenue norms to actual sales parameter and revenue values to determine future targets for the actual sales parameter to increase future revenue in each of the sales regions,
   wherein developing a logged model comprises:
      creating a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i)\ln(F_j)$$

where $F_x$ represents a characteristic of N characteristics for an associated sales region.

16. The method of claim 15, wherein the sales parameter comprises one of price and sales force size.

17. The method of claim 15, wherein the one or more characteristics comprise at least one of population, number of households, geographic size, number of retail businesses, average income of residents, cost of living, number of competitors, and size of competitors.

18. The method of claim 15, wherein the sales parameter norm and the revenue norm represent theoretical averages adjusted for the one or more characteristics.

19. The method of claim 15, wherein developing a logged model further comprises:
performing linear regression analysis on the logged revenue model to determine the parameters $\beta^R$, $\beta_n^R$ and $\beta_{ij}^R$.

20. The method of claim 19, wherein developing a logged model further comprises:
creating a logged model for sales parameters ($C_m$) that comprises:

$$\ln(C_m) = \beta^m + \sum_{n=1}^{N} \beta_n^m \ln(F_n) + \sum_{i=1}^{N-1} \sum_{j=i+1}^{N} \beta_{ij}^m \ln(F_i)\ln(F_j).$$

21. The method of claim 20, wherein developing a logged model further comprises:
performing linear regression analysis on the logged sales parameter model to determine the parameters $\beta^m$, $\beta_n^m$ and $\beta_{ij}^m$.

22. The method of claim 21, wherein the revenue norm ($\overline{R}$) for each sales region comprises:

$$\overline{R} = \exp(\beta_R) \prod_{n=1}^{N} F_n^{\alpha_n^R}, \text{ where}$$

$$\alpha_n^R = \beta_n^R + \sum_{k=n+1}^{N} \beta_{nk}^R.$$

23. The method of claim 22, wherein the sales parameter norm ($\overline{C}_m$) for each sales region comprise:

$$\overline{C}_m = \exp(\beta^m) \prod_{n=1}^{N} F_n^{\alpha_n^m}, \text{ where}$$

$$\alpha_n^m = \beta_n^m + \sum_{k=n+1}^{N} \beta_{nk}^m.$$

24. The method of claim 23, wherein developing a logged model further comprises:
producing a revenue score ($S_R^k$) for each region k according to:

$$S_R^k = \frac{R^k}{\overline{R}^k}$$

where $R_k$ represents an actual revenue for region k.

25. The method of claim 24, wherein developing a logged model further comprises:
producing a sales parameter score ($S_m^k$) for each region k according to:

$$S_m^k = \frac{C_m^k}{\overline{C}_m^k}$$

where ($C_m^k$) represents an actual sales parameter value for region k.

26. The method of claim 25, wherein comparing the sales parameter and revenue norms to actual sales parameter and revenue values comprises:
investigating relationships between the sales parameter and revenue according to:

$$S_R = \delta_1 S_m + \delta_2 S_m^2 + \delta_3 S_m^3 + \ldots + \delta_p S_m^p$$

for p regions and one sales parameter ($C_m$), wherein the parameters $\{\delta_1, \delta_2, \ldots, \delta_p\}$ are determined using linear regression analysis.

27. The method of claim 25, wherein comparing the sales parameter and revenue norms to actual sales parameter and revenue values comprises:
investigating relationships between sales parameters and revenue according to:

$$S_R = \delta_{11} S_i S_j + \delta_{12} S_i S_j^2 + \delta_{13} S_i S_j^3 + \ldots + \delta_{1p} S_i S_j^p + \delta_{21} S_i^2 S_j + \\ \delta_{22} S_i^2 S_j^2 + \delta_{23} S_i^2 S_j^3 + \ldots + \delta_{2p} S_i^2 S_j^p + \delta_{31} S_i^3 S_j + \\ \delta_{32} S_i^3 S_j^2 + \delta_{33} S_i^3 S_j^3 + \ldots + \delta_{3p} S_i^3 S_j^p + \ldots + \delta_{p1} \\ S_i^p S_j + \delta_{p2} S_i^p S_j^2 + \delta_{p3} S_i^p S_j^3 + \ldots + \delta_{pp} S_i^p S_j^p$$

for p regions and two sales parameters $\{C_i, C_j\}$, wherein the parameters $\{\delta_{11}, \delta_{12}, \ldots, \delta_{pp}\}$ are determined using linear regression analysis.

28. A computer-readable medium containing instructions for controlling at least one processor to perform a method for increasing sales revenue in each sales region of a plurality of sales regions, the method comprising:
developing a logged model relating a sales parameter and revenue to one or more characteristics associated with each sales regions of the plurality of sales regions, to produce a sales parameter norm and a revenue norm based on parameters determined by performing an analysis of the logged model, wherein the one or more characteristics comprise at least one of population, number of households, geographic size, number of retail businesses, average income of residents, cost of living, number of competitors, and size of competitors, and wherein the sales parameter comprises one of price and sales force size; and
comparing the sales parameter and revenue model norms to actual sales parameter and revenue values to determine future targets for the actual sales parameter to increase future revenue in each of the sales regions,
wherein developing a logged model comprises:
creating a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i)\ln(F_j)$$

where $F_x$ represents a characteristic of N characteristics for an associated sales region.

29. A system for increasing sales revenue in each sales region of a plurality of sales regions, comprising:
a memory configured to store instructions; and
a processor configured to execute the instructions in the memory to:
create logged sales parameter and revenue models for each of the sales regions of the plurality of sales regions to produce a sales parameter norm and a revenue norm based on parameters determined by performing an analysis of the logged model, and
compare the sales parameter and revenue model norms to actual sales parameter and revenue values to determine future targets for the actual sales parameter to increase future revenue in each of the sales regions, wherein instructions to create a logged revenue model comprise instructions to:
create a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i) \ln(F_j)$$

where $F_x$ represents a characteristic of N characteristics for an associated sales region.

30. A computer system for increasing sales revenue in each sales region of a plurality of sales regions, comprising:
means for creating logged sales parameter and revenue models for each of the sales regions of the plurality of sales regions to produce a sales parameter norm and a revenue norm based on parameters determined by performing an analysis of the logged sales parameter and revenue models; and
means for comparing the sales parameter and revenue norms to actual sales parameter and revenue values to determine future targets for the actual sales parameter to increase future revenue in each of the sales regions,
wherein creating a logged revenue model comprises:
creating a logged model for revenue (R) that comprises:

$$\ln(R) = \beta^R + \sum_{n=1}^{N} \beta_n^R \ln(F_n) + \sum_{i=1}^{N-1} \sum_{j=i+1}^{N} \beta_{ij}^R \ln(F_i) \ln(F_j)$$

where $F_x$ represents a characteristic of N characteristics for an associated sales region.

\* \* \* \* \*